Figure 1:
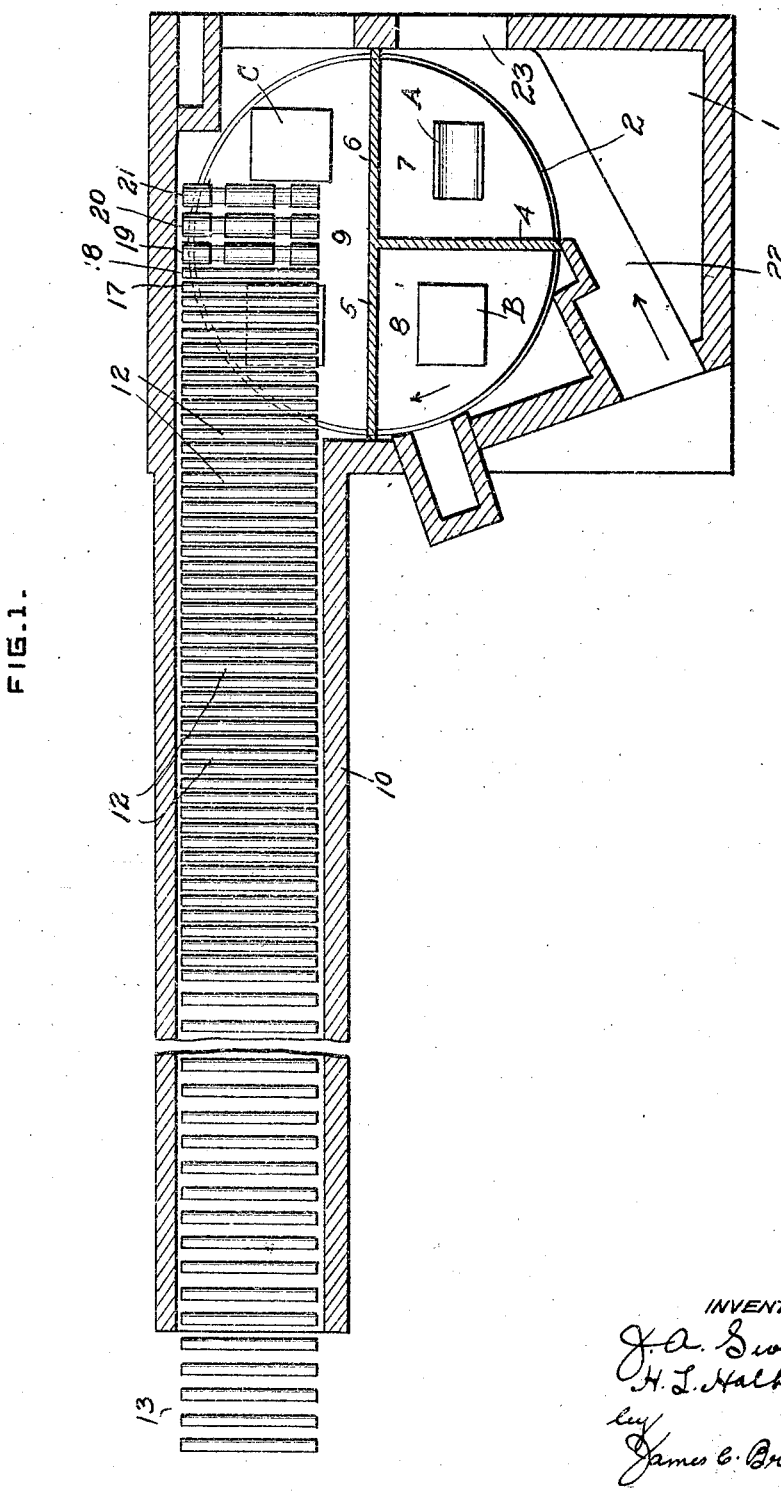

March 8, 1927. 1,620,017
H. L. HALBACH ET AL
PROCESS OF FLATTENING WINDOW GLASS SHAWLS
Filed June 9, 1926   2 Sheets-Sheet 2

INVENTORS.
J. A. Sweet
H. L. Halbach
by
James C. Bradley
atty

Patented Mar. 8, 1927.

1,620,017

UNITED STATES PATENT OFFICE.

HOWARD L. HALBACH, OF CLARKSBURG, WEST VIRGINIA, AND JOHN A. SWEET, OF PITTSBURGH, PENNSYLVANIA, ASSIGNORS TO PITTSBURGH PLATE GLASS COMPANY, A CORPORATION OF PENNSYLVANIA.

PROCESS OF FLATTENING WINDOW GLASS SHAWLS.

Application filed June 9, 1926. Serial No. 114,759.

Figure 2:
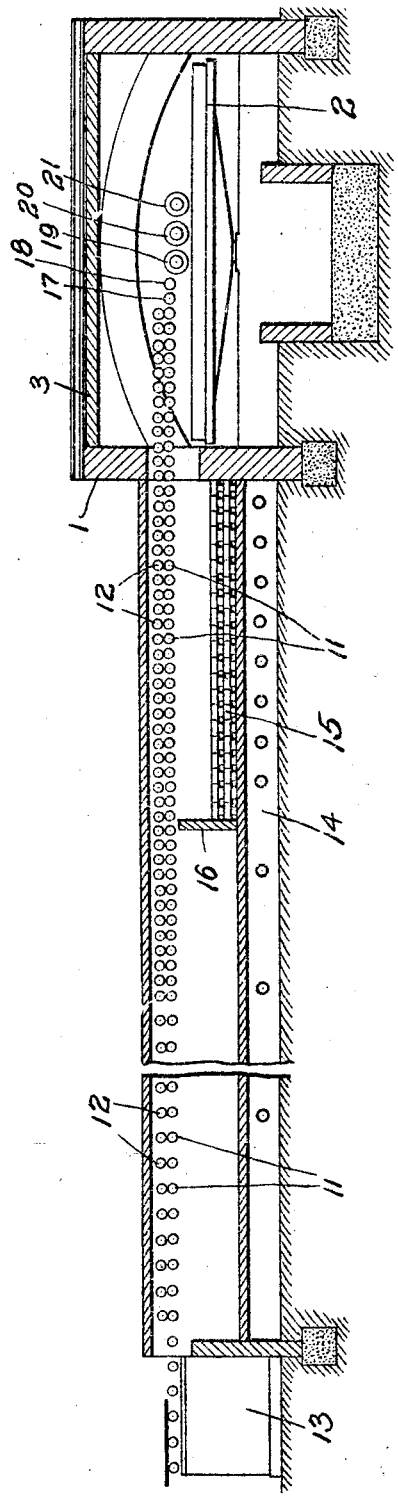

The invention relates to a process for flattening the partial cylinder sections, into which glass cylinders are split or divided. Heretofore, it has been customary to flatten the sections upon a flat stone or wheel mounted for rotation, after which the sections were allowed to anneal by passing them through a rod leer. The flattening operation involved the use of a rubbing block of wood applied by the operator after the temperature of the section was raised to a point where the glass lost its rigidity, permitting it to be flattened, this temperature being in the neighborhood of 1200 degrees F. The glass was flattened at as low a temperature as possible, in order to reduce the danger of marring its surface when it came into contact with the flattening stone. This process has never given perfectly flat glass, the sheets all being somewhat bowed. An attempt has been made to still further flatten the glass in the rod leer, by carrying it at a temperature high enough to cause it to flatten of its own weight in the first section of the leer. This procedure does increase the flatness of the glass sheets, but in some cases, the sheets are marred by the rods, since the temperature required to cause the glass to flatten of its own weight is dangerously close to that at which the glass will be so softened upon its surface, that it will be marred by the rods of the leer, and it is a very difficult matter to secure the additional flatness desired without impairing the surface of a considerable part of the product. The present invention is designed to overcome the difficulty above recited, so that the glass can be further flattened after leaving the regular flattening stone without the use of dangerously high temperatures, thus avoiding the danger of marring. The invention is further designed to give a flatter product than that formed in the rod leer, which result is accomplished by positively holding the glass in perfectly flat form until it has hardened, so that it will not substantially depart from such form. The period during which the glass must be held in flat condition will vary considerably, but in order to be upon the safe side, it should be held against warping until its temperature has at least dropped through the critical annealing range (about 1050 degrees F. to about 950 degrees F., depending on the glass). As illustrated, it is so held until the glass has dropped to a temperature at which it may be readily handled and cut, namely, about 130 degrees F. One form of apparatus for carrying out the process is illustrated in the accompanying drawings, wherein:

Figure 1 is a horizontal section through the apparatus, and Fig. 2 is a vertical longitudinal section, both views being diagrammatic in character.

Referring to the drawings, 1 is the flattening chamber of the type ordinarily used in window glass work provided with the usual rotating flattening wheel or stone 2 having its upper surface of relatively smooth refractory material, as it is against this surface that the cylinder sections are flattened. Projecting downwardly from the roof 3 of the chamber are the partition walls 4, 5 and 6 dividing the space above the stone 2 into three chambers 7, 8 and 9. These chambers are maintained at different temperatures in accordance with the usual practice, the cylinder section to be flattened being inserted into the chamber 7 and then carried on the stone or wheel into the chambers 8 and 9. Leading away laterally from the side of the flattening chamber is the leer chamber 10, such chamber being provided with two sets of opposing rolls 11 and 12 for use, as hereinafter described. At the outlet end of the leer is a table 13 upon which the glass sheets emerge and from which they are carried to the cutting room. Extending longitudinally beneath the leer is a heating chamber 14 provided with suitable gas burners at intervals, the arrangement being such as to give a gradually decreasing temperature from the entrance, or right hand end thereof, to the left hand end. In order to give an even heat in the right hand end of the leer, the checker work 15 is provided above the heating chamber in connection with an end wall 16, and the heat applied to this section of the leer is much greater than that applied to the left hand end of the leer. At the right hand end of the two sets of rolls 11 and 12 is a roller section made up of the rolls 17 to 21 adapted to receive the glass sheet preliminary to its final flattening between the two sets of rolls 11 and 12.

In operation, a cylinder section or shawl is moved through the runway 22 by the shove boy until it reaches a point where the flattener, working through the opening 23, can engage it with his bar and lift it onto the table 2 where it is turned with its convex side down, as indicated at A in Fig. 1. The heat in this chamber is such that the glass soon loses its stiffness to such an extent that it can be readily flattened out against the surface of the stone by the use of the usual wood smoothing block. This flattening can be done without softening the lower surface of the sheet so that it will take the impression of the stone, although in some cases, this occurs. The stone is then rotated 90 degrees carrying the sheet to position B in the chamber 8, the temperature in this chamber being slightly lower than that in the chamber 7. On a further rotation of the wheel, the sheet is carried to position C in the chamber 9. The sheet is now as flat as is the case with ordinary window glass, but it still has a certain amount of bow, which it is the purpose to eliminate in the succeeding step of the operation. At this time, the glass is still at a temperature such that it can be deformed or straightened, but its surface is hard enough so that it is not marred by relatively light contact with hard surfaces. At this point, the sheet is lifted by the operator upon his fork and placed upon the rolls 17 to 21, the operator working through the opening 24 in accomplishing this transfer. The openings 23 and 24 are closed by swinging doors to conserve the heat in the heating chamber, when the operator is not manipulating his tools through such opening. The two sets of rolls 11 and 12 are suitably driven by means, not shown, and are preferably water cooled by circulating a flow of water therethrough. The glass is carried slowly between the two sets of rolls and during this movement, the sheet is brought to a perfectly flat condition, the pressure of the upper rolls during this period being adjusted to avoid thinning the sheet or marring its surface. The temperatures in the leer are so regulated that the sheet becomes cooler as it moves along, and while it is still held in flat position, it hardens and sets permanently. It is further held in this position at least through the critical annealing range, after which point, the upper set of rolls 12 may be discontinued. As shown, the upper set of rolls 12 extends clear to the end of the leer, but this is not necessary. The use of the checker work at 15 in connection with the wall 16 insures an even heat, as the glass passes through the critical annealing range and the drop in temperature during this period is very slow in order to give good annealing. After the glass passes the wall 16, the temperature of the leer may decrease very much more rapidly, so that by the time the glass emerges on the table 13, it is cool enough to handle. The glass is in this manner flattened in two steps and the danger of marring in the second step is reduced by reason of the fact that with pressure applied to bring the sheet to flat condition, the glass can be carried at a lower temperature than would be the case if it were flattened by gravity and the danger of marring is, therefore, less. As the sheets are held in flat position after they set, and during the critical annealing period, they permanently maintain this condition. The tendency to mar in passing between the rollers 11 and 12 is also reduced as compared with such danger where leer bars are employed for the reason that the rolling friction on constantly shifting lines tends to make less impression upon the glass than the relatively long continued period of contact between the glass and the leer bars when such leer bars are employed. The amount of labor involved is no greater than with the other type of construction involving the leer bars as a flatter and a better product is secured.

What we claim is:

1. The process of flattening a bent sheet, which is a part of a cylinder of glass, which consists in exposing it to a temperature such as to bring it to flattening condition, supporting it against bodily lateral movement while applying flattening pressure thereto to partially flatten it, giving the sheet a movement of translation edgewise, applying rolling pressure to the sheet on opposite sides to completely flatten it, while at a temperature such that it may be flattened without marring, and continuing such movement of translation of the sheet while exposed to said rolling pressure at a decreasing temperature until the sheet sets permanently in flat form.

2. The process of flattening a bent sheet which is a part of a cylinder of glass, which consists in supporting it upon a flattening stone exposed to a degree of heat such as to bring it to flattening condition, applying pressure to the upper face of the sheet to partially flatten it, giving it a motion of translation between a series of opposing parallel members to flatten it while still maintaining it at a temperature at which it may be permanently flattened without marring its surface, and continuing such movement of translation between said members and thus holding it flat while the sheet is cooling until it sets permanently in flat form.

3. The process of flattening a parti-cylindrical sheet of glass, which consists in supporting the sheet with its convex side down upon a flat refractory surface and exposing it to a heat such that it loses its stiffness permitting it to be flattened, applying force over the upper face of the sheet to press it down against said surface, transferring the sheet to a support, pressing it down upon such support, while the glass is at a temperature such that it will flatten permanently, but without any substantial marring thereof, and carrying the sheet along, while thus held flat, exposed to a decreasing temperature until the sheet has set in flat condition.

4. The process of completing the flattening of a partially flattened sheet of glass heated to flattening temperature which consists in giving the sheet a motion of translation and during such movement applying rolling pressure to the sheet on opposite sides to completely flatten it while still maintaining it at a temperature such that it may be permanently flattened without marring its surface, and continuing such movement of translation of the sheet while exposed to said rolling pressure while the sheet is cooled until it sets permanently in flat form.

5. The process of completing the flattening of a partially flattened sheet of glass heated to flattening temperature which consists in giving the sheet a motion of translation and during such movement applying rolling pressure to the sheet on opposite sides to completely flatten it while still maintaining it at a temperature such that it may be permanently flattened without marring its surface, and continuing such movement of translation of the sheet while exposed to said rolling pressure while the sheet is cooled until it sets permanently in flat form and its temperature reaches a point below that of the critical annealing range of the glass.

In testimony whereof, we have hereunto subscribed our names.

HOWARD L. HALBACH.
JOHN A. SWEET.